US010882044B1

(12) United States Patent
Bahammam

(10) Patent No.: US 10,882,044 B1
(45) Date of Patent: Jan. 5, 2021

(54) CULTURE PLATE AID

(71) Applicant: King Abdulaziz University, Jeddah (SA)

(72) Inventor: Laila Ahmed Bahammam, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/007,058

(22) Filed: Aug. 31, 2020

(51) Int. Cl.
*G01N 21/00* (2006.01)
*B01L 3/00* (2006.01)

(52) U.S. Cl.
CPC ..... *B01L 3/50853* (2013.01); *B01L 2200/025* (2013.01); *B01L 2200/0684* (2013.01); *B01L 2200/0689* (2013.01); *B01L 2200/141* (2013.01); *B01L 2200/142* (2013.01); *B01L 2300/048* (2013.01); *B01L 2300/0829* (2013.01); *B01L 2300/0848* (2013.01)

(58) Field of Classification Search
CPC ....................... G01N 21/6452; G01N 21/6428
USPC ................................. 436/164, 172; 422/569
See application file for complete search history.

(56) References Cited

U.S. PATENT DOCUMENTS

| | | | |
|---|---|---|---|
| 4,919,894 A | 4/1990 | Daniel |
| 7,597,854 B1 | 10/2009 | Reynolds |
| 2007/0009394 A1 | 1/2007 | Bean |

OTHER PUBLICATIONS

Thomas Scientific, "96-Well Clear Bottom Black Polystyrene Microplates", thomassci.com/E-K/Microplates/96-Well-Plates, Viewed Aug. 10, 2020.

Sigma-Aldrich, "Pipettor guide, double wide, aligns pipettor with multiwell plate", sigmaaldrich.com/catalog/product/sigma, Viewed Aug. 10, 2020.

*Primary Examiner* — Natalia Levkovich
(74) *Attorney, Agent, or Firm* — W&C IP

(57) ABSTRACT

A multiwell plate cover is provided, wherein the cover comprises a frame configured for attachment to a multiwell plate; a first movable guide member having two elongated side members that extend across the width of the plate, wherein a gap between the side members is substantially equal to a diameter of a single well in the multiwell plate and wherein the first movable guide member is slidable along the length of the frame; and a second movable guide member having two elongated side members that extend across the length of the plate, wherein a gap between the side members is substantially equal to a diameter of a single well in the multiwell plate and wherein the second movable guide member is slidable along the width of the frame, wherein the first and second movable guide member are configured to move independently from each other.

5 Claims, 6 Drawing Sheets

CULTURE PLATE AID

FIELD OF THE INVENTION

The invention is generally related to a multiwell plate cover that delineates wells of a culture plate for improved identification and imaging of the wells.

BACKGROUND OF THE INVENTION

Microplates, also known as multiwell plates and microtitre plates, are regularly used in medical, chemical, and biological laboratories. Microplates have a plurality of sample wells typically arranged in a 2:3 rectangular matrix. For example, a common configuration for a microplate has 96 wells arranged in an 8×12 matrix.

In the laboratory, microplates are commonly supplied with various liquids, e.g. samples, reagents, and solvents. The particular liquids used will depend on the test being performed. During use, it is important to the accuracy of the laboratory procedure being performed that each liquid be dispensed into the desired well without cross contamination or unintended dispensing of a liquid into the wrong well. In plates with numerous wells, identifying the exact well for placement of different reagents can be difficult which can negatively affect the outcome of the experiment.

When used for cell culture, cells tend to grow at the periphery of the wells. During microscopic imaging of these cells, the well periphery is not seen at higher magnifications and one can accidently move to the next well without knowing, especially in flourescent assays and when using 96 or 48 well plates. Because of the difficulty in locating wells in a cell culture plate at higher magnification, mixing and jumping between wells can occur, thus providing unreliable experimental data.

Repeating experiments that may have had dispensing or imaging errors is costly and wastes time. Novel technological solutions that address the above problems with dispensing solutions into and imaging multiwell plates are needed.

SUMMARY

Disclosed herein is a multiwell plate cover that delineates wells of a culture plate for improved identification of wells when dispensing solutions and performing microscopic imaging, especially for flourescent assays.

An aspect of the disclosure provides a multiwell plate cover, comprising a frame configured for attachment to a multiwell plate; a first movable guide member having two elongated side members that extend across the width of the plate, wherein a gap between the side members is substantially equal to a diameter of a single well in the multiwell plate and wherein the first movable guide member is slidable along the length of the frame; and a second movable guide member having two elongated side members that extend across the length of the plate, wherein a gap between the side members is substantially equal to a diameter of a single well in the multiwell plate and wherein the second movable guide member is slidable along the width of the frame, wherein the first and second movable guide member are configured to move independently from each other.

In some embodiments, the first and second movable guide members are formed from an opaque material. In some embodiments, the first movable guide member has markings indicative of a row in which each well is located. In some embodiments, the second movable guide member has markings indicative of a column in which each well is located. In some embodiments, the first and second movable guide members are configured to cover a portion of a well adjacent to the well arranged within the gap of the side members.

Another aspect of the disclosure provides a method of imaging a well in a multiwell plate, comprising applying a cover as described herein to the plate; adjusting the first and second movable guide members until the well is viewable through the gap created by the elongated side members of the first and second movable guide members; and imaging the well.

DETAILED DESCRIPTION

Embodiments of the disclosure provide a reusable, lightweight cover that is placed over a multiwell plate to aid in 1) identifying the specific well, row, or column in which different solutions are to be added and 2) delineating the targeted well to be imaged without unintended mixing between adjacent wells.

Figure 1:
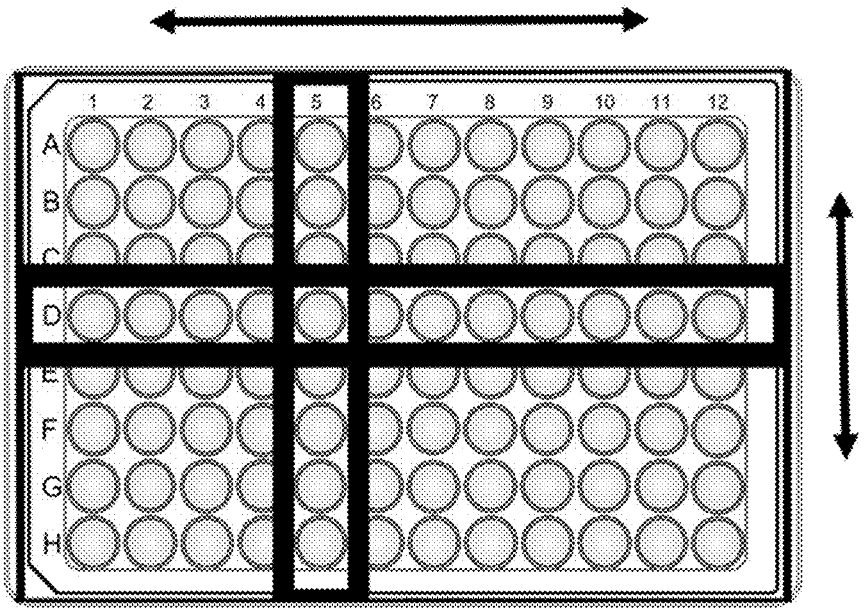
FIG. 1. Illustration of the movement of the guide members according to some embodiments of the disclosure.

With reference to FIG. 1, in use, the cover is positioned on top of the microplate which typically comprises a matrix of wells. Commonly used microplates have wells arranged in a 2:3 rectangular matrix, for example a 6×8 matrix totaling 48 wells or an 8×12 matrix totaling 96 wells, etc. The cover is useful with microplates having different numbers of wells and different configurations but is illustrated and explained herein with reference to 96 well microplates for purposes of illustration.

Figure 2A:
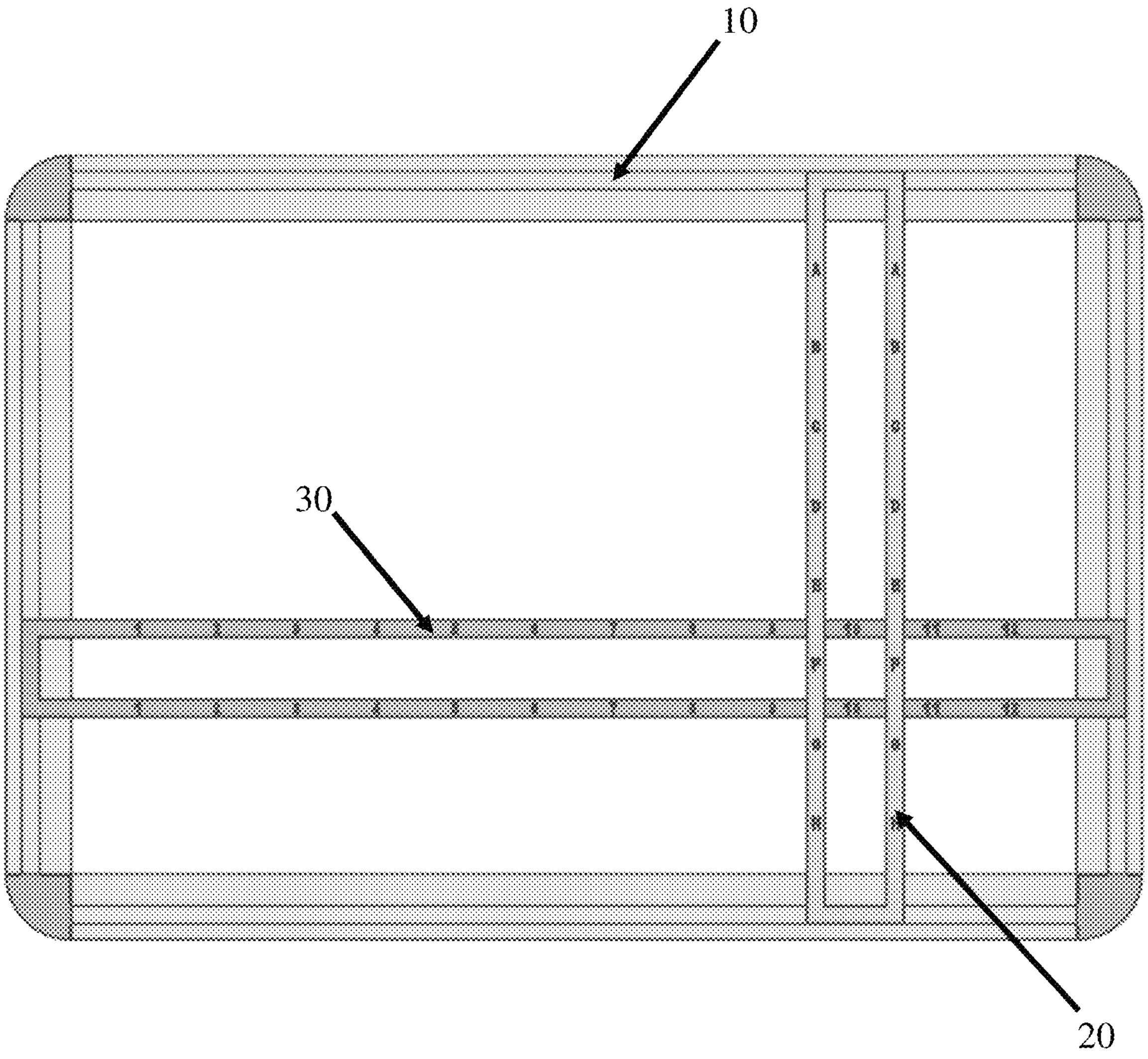
FIGS. 2A-B. (A) Top and (B) side view of a multiwell plate cover according to some embodiments of the disclosure.
Figure 2B:
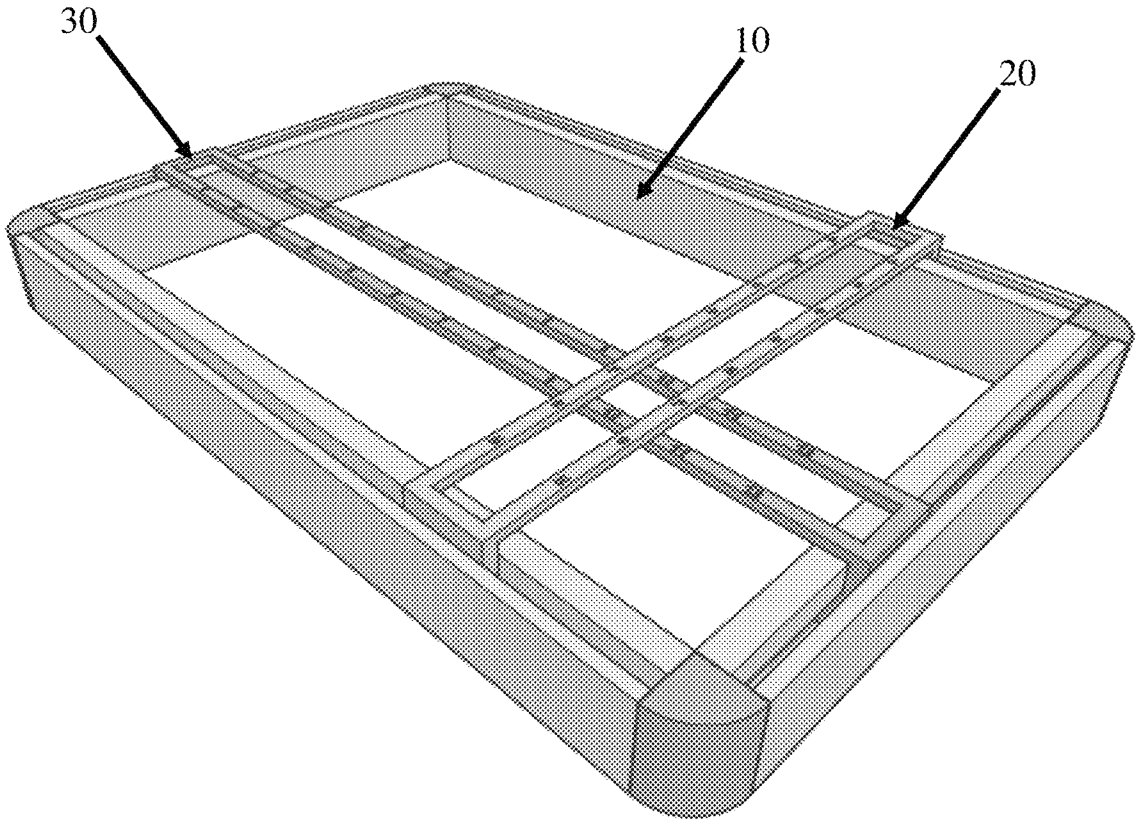
Figure 3A:
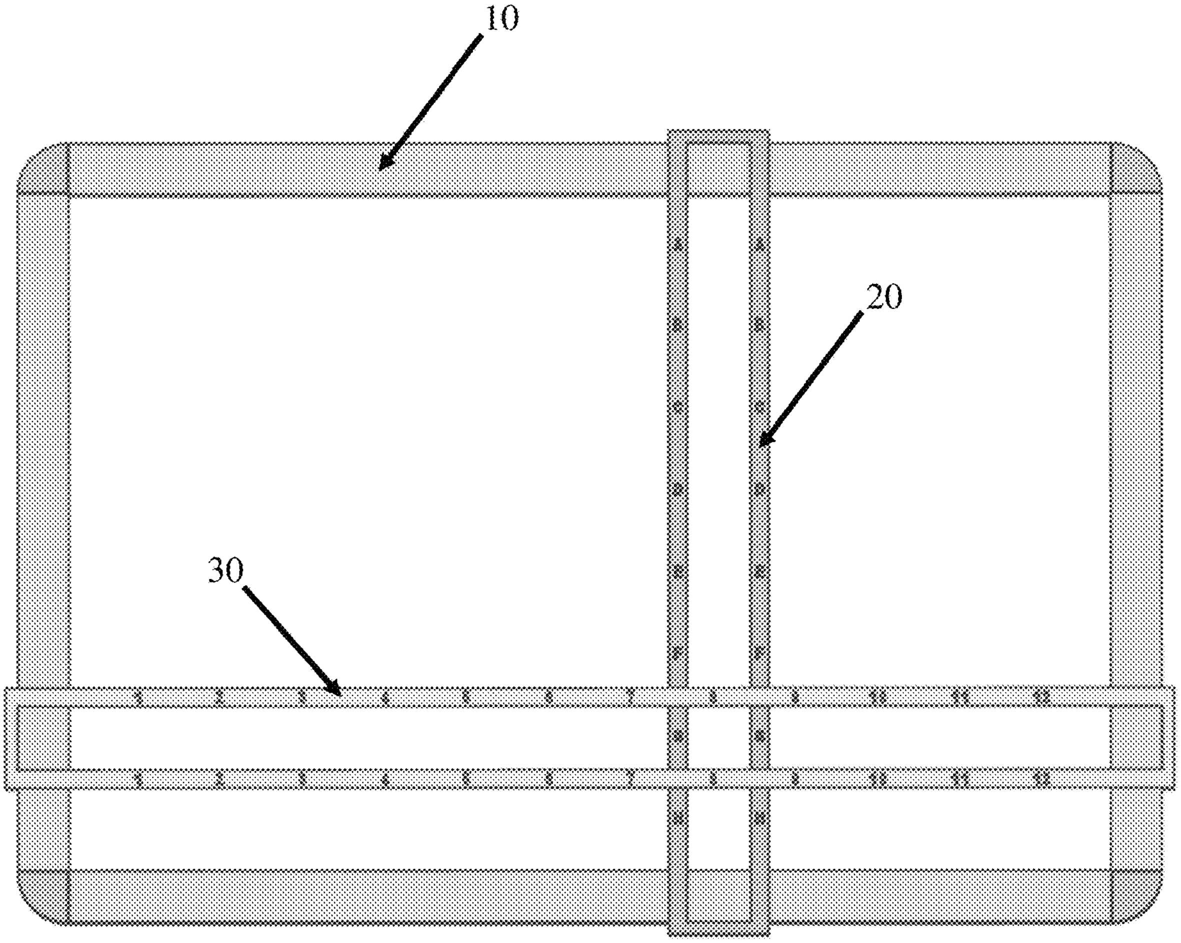
FIGS. 3A-B. (A) Top and (B) side view of a multiwell plate cover having an alternative frame design according to some embodiments of the disclosure.
Figure 3B:
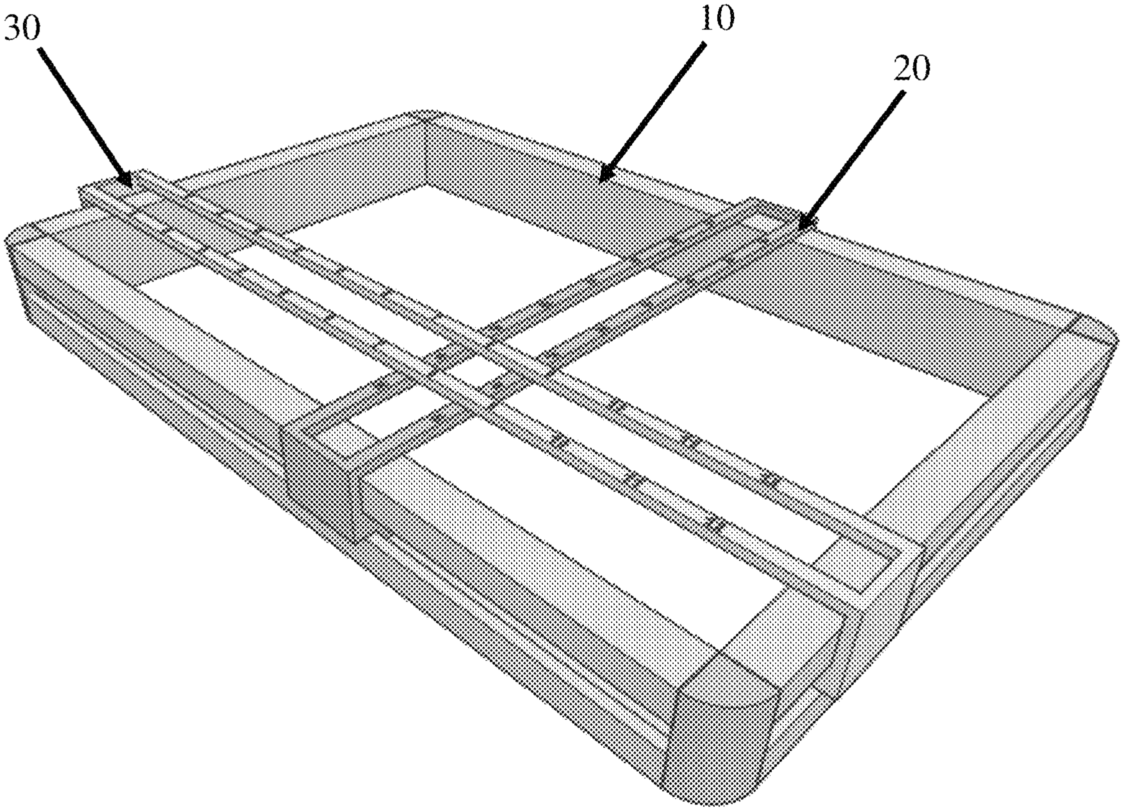

With reference to FIGS. 2-3, the multiwell plate cover comprises a frame 10 configured for attachment to a multiwell plate; a first movable guide member 20 having two elongated side members that extend across the width of the plate, wherein a gap between the side members is substantially equal to a diameter of a single well in the multiwell plate and wherein the first movable guide member is slidable along the length of the frame (horizontally); and a second movable guide member 30 having two elongated side members that extend across the length of the plate, wherein a gap between the side members is substantially equal to a diameter of a single well in the multiwell plate and wherein the second movable guide member is slidable along the width of the frame (vertically). As shown in FIG. 1, the first and second movable guide members are configured to move independently from each other. By moving each of the guide members, every well in the plate may be encircled (and every row and column in the plate may be delineated).

Figure 4:
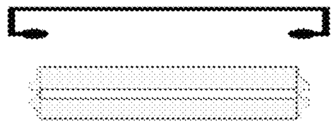
FIG. 4. XY or coordinate table joint according to some embodiments of the disclosure.
Figure 5:
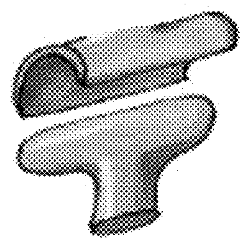
FIG. 5. Ball and socket joint according to some embodiments of the disclosure.

The guide members may be attached to the frame via a joint that enables bidirectional movement, such as an XY or coordinate table joint (FIG. 4) or ball and socket joint (FIG. 5) or any possible joint that provides such movement.

In some embodiments, the first movable guide member has markings, e.g. sequential letters or numbers, indicative of a row in which each well is located. In some embodiments, the second movable guide member has markings, e.g. sequential letters or numbers, indicative of a column in which each well is located. When the cover is place on a multiwell plate, the markings help the user to identify the specific wells, row, or column in which to add reagents during an experiment.

During imaging, the cover helps the user to delineate a targeted well for taking images. The user would first adjust the movable guide members to surround the targeted well. In some embodiments, the first and second movable guide members are configured to cover a portion of the wells adjacent to the well arranged within the gap of the side members. Thus, all the areas surrounding the targeted well will appear dark under a microscope (magnification) and the targeted well may be examined and photographed without mixing wells. Delineation of the wells by covering part of the adjacent wells helps to prevent crosstalk during photography of fluorescent assays.

Embodiments of the disclosure provide a method of imaging a well in a multiwell plate, comprising applying a cover as described herein to the plate; adjusting the first and second movable guide members until the well is viewable through the gap created by the elongated side members of the first and second movable guide members; and imaging the well. The dark arms of the guide members delineate the well by partially covering adjacent wells to prevent crosstalk during imaging.

The cover disclosed herein may be placed on a multiwell plate with or without the presence of the standard impermeable plate cover. The cover can be used with all types and sizes of culture plates (tissue or cell culture plates).

The cover is preferably formed from a material, such as a thin plastic material, which will have sufficient durability during the expected life span in the environment in which it will be used, including contact with the fluids used during various procedures. For example, suitable materials for most applications include polyethylene and polypropylene. In some embodiments, the first and second movable guide members are formed from an opaque material such that, during imaging, the dark lines of the guide members delineate the targeted well and mask at least a portion of the surrounding wells.

By using a cover as described herein, the productivity, efficiency and accuracy of the data will be increased in a shorter time and with less effort which will lower research expenses. The cover minimizes the risk of error by simplifying the process and removing the need to repeat readings or experiments in order to confirm results.

Before exemplary embodiments of the present invention are described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms “a”, “an”, and “the” include plural referents unless the context clearly dictates otherwise. It is further noted that the claims may be drafted to exclude any optional element. As such, this statement is intended to serve as antecedent basis for use of such exclusive terminology as “solely,” “only” and the like in connection with the recitation of claim elements, or use of a “negative” limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

We claim:

1. A method of imaging a well in a multiwell plate, comprising:

applying a cover to the multiwell plate, wherein the cover comprises a frame configured for attachment to the multiwell plate;

a first movable guide member having two elongated side members that extend across the width of the plate, wherein a gap between the side members is substantially equal to a diameter of a single well in the multiwell plate and wherein the first movable guide member is slidable along the length of the frame; and a second movable guide member having two elongated side members that extend across the length of the plate, wherein a gap between the side members is substantially equal to a diameter of a single well in the multiwell plate and wherein the second movable guide member is slidable along the width of the frame, wherein the first and second movable guide member are configured to move independently from each other;

adjusting the first and second movable guide members until the well is viewable through the gap created by the elongated side members of the first and second movable guide members; and imaging the well.

2. The method of claim 1, wherein the first and second movable guide members are formed from an opaque material.

3. The method of claim 1, wherein the first movable guide member has markings indicative of a row in which each well is located.

4. The method of claim 1, wherein the second movable guide member has markings indicative of a column in which each well is located.

5. The method of claim 1, wherein the first and second movable guide members are configured to cover a portion of a well adjacent to the well arranged within the gap of the side members.

* * * * *